United States Patent Office 2,780,738
Patented Feb. 5, 1957

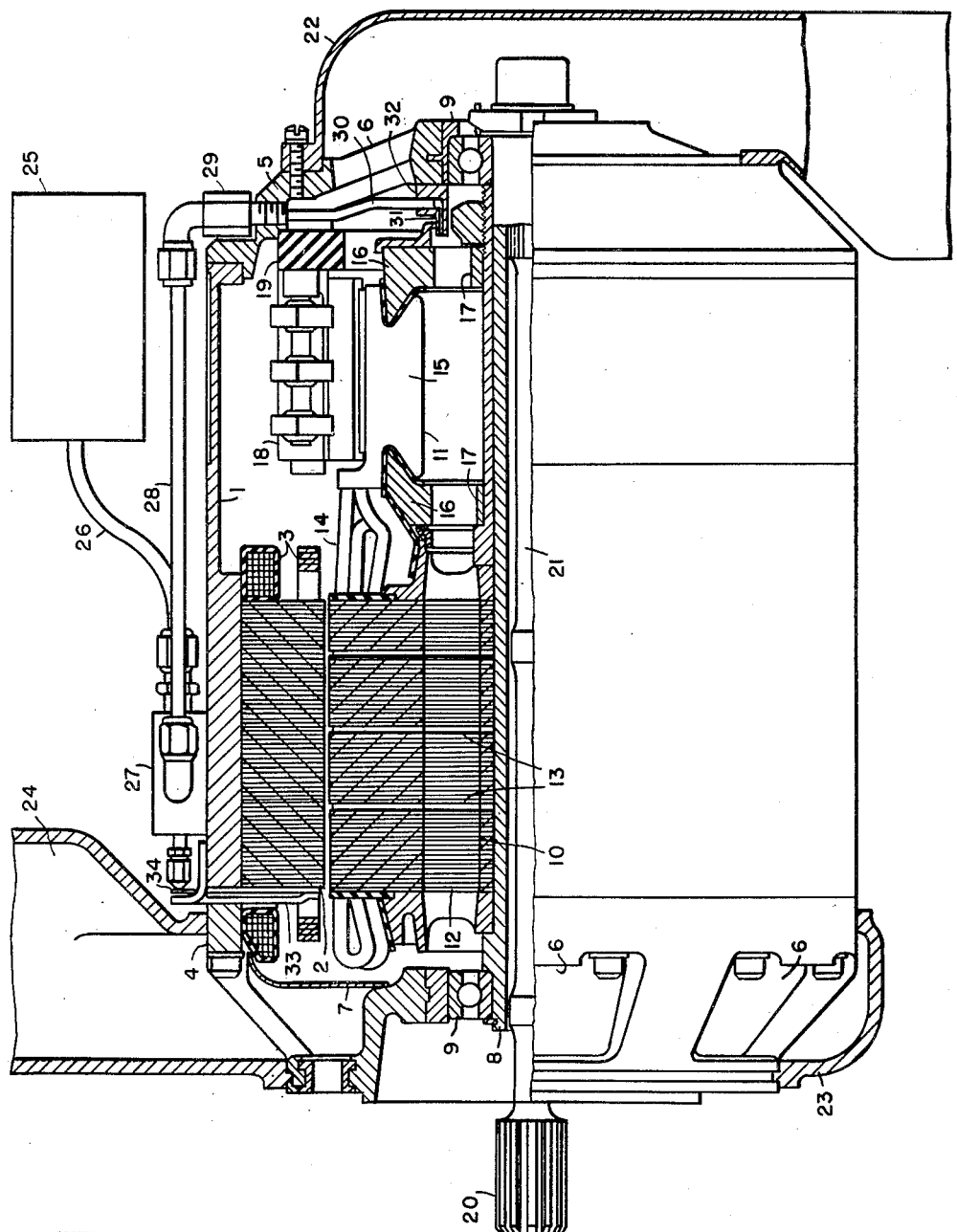

2,780,738

VAPORIZATION COOLED DYNAMOELECTRIC MACHINE

Harry D. Else, Lima, Ohio, assignor to Westinghouse Electric Corporation, East Pittsburgh, Pa., a corporation of Pennsylvania Application November 25, 1953, Serial No. 394,254

7 Claims. (Cl. 310—54)

The present invention relates to the cooling of dynamoelectric machines, and more particularly to the cooling of aircraft generators by vaporization of a liquid.

Aircraft generators, which are used to supply the electrical loads on airplanes, are necessarily of small physical size, as compared to other types of machines of equivalent rating, and therefore must be very effectively cooled to obtain reasonable life. Heretofore, aircraft generators have been cooled by forcing a blast of air through them, the air being taken in by an air scoop on the airplane so that the forward movement of the airplane through the air produced a pressure drop across the generator which forced a high-velocity blast of air through it.

With the increasing maximum speeds of present-day aircraft, however, it has become increasingly difficult to obtain adequate cooling in this manner. This is for the reason that, even though the ambient temperature of the air may be quite low, the maximum speeds of modern aircraft are such that when the air is forced through a generator in the manner described above, its velocity is so high that its kinetic energy is very great, and the effective temperature of the air when it strikes the surfaces of the generator is so high that the cooling effect is greatly reduced. The maximum speeds now attainable, or expected to be attained in the near future, are rapidly approaching the point where adequate cooling of aircraft generators can no longer be obtained by an air blast in the conventional manner, and they are not far from the point where no cooling at all could be obtained in this manner. It is necessary, therefore, to provide some other means of cooling aircraft generators which can be used to supplement the air cooling, or even to replace it, and the present invention provides means for cooling such generators by absorbing heat by vaporization of a suitable liquid.

The principal object of the invention, therefore, is to provide means for cooling a dynamoelectric machine by vaporization of a liquid, either alone or in combination with air cooling, so that adequate cooling of the machine can be obtained without relying on air cooling alone.

Another object of the invention is to provide a dynamoelectric machine which is cooled by directing a stream of vaporizable liquid against a heated part of the machine so that the liquid is vaporized and thus directly cools the machine, the vapor and excess liquid passing on through ventilating passages to cool other parts of the machine.

A further object of the invention is to provide a direct-current dynamoelectric machine which is cooled by directing a stream of vaporizable liquid against the inside surface of the commutator to cool it by vaporization of the liquid, the commutator being constructed so that excess liquid is discharged from it through passages in the armature member to be vaporized therein and thus cool the armature.

A still further object of the invention is to provide a dynamoelectric machine which is cooled by means of a stream of vaporizable liquid, in combination with a stream of air which may provide some additional cooling effect and which carries the liquid and vapor through the machine, together with temperature responsive means for controlling the flow of liquid to limit the amount of liquid used to that actually required.

Other objects and advantages of the invention will be apparent from the following detailed description, taken in connection with the accompanying drawing, the single figure of which is a view, partly in elevation and partly in longitudinal section, showing a dynamoelectric machine embodying the invention.

As previously indicated, the invention is particularly intended for cooling aircraft generators and is shown in the drawing embodied in a direct-current aircraft generator. The machine shown in the drawing is in general of more or less typical construction, and has a cylindrical frame 1 on which are mounted pole pieces 2 carrying field windings 3. The ends of the frame 1 are closed by end brackets 4 and 5 which are provided with openings 6 to permit the flow of air through the machine, the openings being screened, if desired, at either or both ends, as indicated at 7. The machine has a rotor member which includes a hollow shaft 8 supported in bearings 9 in the end brackets 4 and 5. A laminated armature core 10 and a commutator 11 are supported on the shaft 8. The armature core 10 is provided with axial ventilating passages 12 and radial ventilating ducts 13 communicating with the passages 12, and it has peripheral slots in which an armature winding 14 of any suitable type is placed.

The commutator 11 comprises a plurality of commutator bars 15 of any usual type disposed in the usual manner in a cylinder surrounding the shaft 8 and clamped together by steel V-rings 16 at each end which are insulated from the commutator bars by mica V-rings. The commutator 11 may be of any usual or desired construction but it is arranged so that the bars are spaced a substantial distance from the shaft 8 and the V-rings 16, or other clamping means, are provided with a plurality of circumferentially spaced axial openings 17 between the commutator bars and the shaft. The openings 17 at the end of the commutator adjacent the armature 10 extend to a larger radius than the openings at the other end of the commutator, as clearly shown in the drawing, for a purpose to be described hereinafter. The generator is provided with brush rigging of any suitable or usual type, shown as consisting of brush holders 18 supported on a rocker ring 19 secured to the end bracket 5.

The generator is preferably designed to be driven directly from a main engine of an airplane by means of a splined coupling member 20 which drives the generator through a torsionally resilient spindle 21 connected to the hollow shaft 8 at the end opposite to the drive end. An air shield 22 is secured to the end bracket 5 at the commutator end of the machine over the openings 6 to direct a blast or stream of air through the machine. A shroud or air shield 23 is similarly secured over the openings 6 of the end bracket 4 at the opposite end of the machine with an outlet 24 for exhausting air and liquid from the machine.

As previously explained, aircraft generators have conventionally been cooled by a high-velocity blast of air directed into the machine through the air shield 22, the high velocity of the air being derived from the forward movement of the airplane through the surrounding air. The air velocities obtained in this way at the maximum speeds attainable in modern aircraft have become so high, however, that the kinetic energy of the air is very great, and the effective temperature of the air when it strikes the generator surfaces is so high that the cooling effect is greatly reduced. As the maximum speeds of airplanes increase, it is becoming increasingly difficult to obtain adequate cooling by means of an air blast, and it is readily foreseeable that speeds will soon be attained at which no appreciable cooling can be obtained in this manner.

In accordance with the present invention, the generator is cooled by vaporization of a liquid directed against the heated surfaces of the generator. Any suitable liquid may be utilized, but it is preferred to use water since it has the highest latent heat of vaporization of any readily available liquid. Because of the relatively high freezing point of water, it may be necessary to mix with it some liquid such as methyl alcohol for the purpose of lowering the freezing point. Other suitable vaporizable liquids might, however, be used.

The liquid may be supplied from a tank 25 carried on the airplane through a duct 26 to a valve 27 mounted on the frame 1 of the generator, or the liquid may be supplied to the valve 27 in any other desired manner. A duct 28, which may be made of copper tubing, extends from the valve 27 to the end bracket 5 at the commutator end of the machine and is connected to a fitting 29 of any suitable type extending through the bracket 5. A duct 30 is mounted on the inside of the end bracket 5 and connected to the fitting 29. The other end of the duct 30 extends near the shaft 8 and is provided with nozzle means 31 extending towards the commutator 11. The nozzle 31 may simply consist of an orifice in a metal member 32 attached to the central hub portion of the bracket 5, or any other suitable type of nozzle means may be used. The nozzle 31 is stationary and it is positioned so as to be directly opposite the opening 17 in the adjacent V-ring 16 of the commutator.

It will be seen that when the valve 27 is opened, a stream of vaporizable liquid is directed through the ducts 28 and 30 and the nozzle 31 into the interior of the commutator 11 through the openings 17, and since the commutator is rotating at relatively high speed during operation of the machine, the stream of liquid is directed radially outward against the interior surface of the commutator. The liquid thus striking the inner surface of the commutator is vaporized by the heated commutator bars, and in vaporizing absorbs heat from the commutator equivalent to the latent heat of vaporization of the liquid, thereby effectively cooling the commutator. An excess quantity of liquid will normally be utilized, so that it is not all vaporized in the commutator, and excess liquid will therefore tend to build up in a layer on the inner surface of the commutator until it reaches the openings 17. As previously described, the openings 17 in the V-ring nearest the armature 10 extend to a greater radius than those at the other end and the excess liquid tending to accumulate in the commutator is therefore discharged through these openings into the axial passages 12 in the armature. Liquid escaping into these passages is thrown radially outward through the radial ducts 13 and is vaporized upon contacting the hot armature laminations, thus cooling the armature.

In addition to the liquid cooling described above, a stream of air is preferably also directed through the generator by means of the air shield 22. This air stream contributes to the cooling of the machine, since it flows through the machine at high velocity, and it also carries with it the vapor and any excess liquid, which is thus exhausted from the machine through the shroud 23 and vent 24.

It will be evident that very effective cooling of a dynamoelectric machine can be obtained in the manner described by the use of a vaporizable liquid which is vaporized by contact with the hot surfaces of the machine and thereby cools them. It would be possible to provide sufficient cooling by this means alone to maintain the temperatures in the machine within the desired limits, thus avoiding any reliance on air cooling at all. As a practical matter, however, it is necessary to provide some air flow to carry the vapor and excess liquid through the machine to avoid condensation of vapor and accumulation of liquid in the cooler parts of the machine. Since an air flow is thus necessary, it can be utilized to provide some cooling effect and thus to reduce the amount of liquid necessary. The volume of liquid may then be varied in accordance with the cooling requirements of the machine so that when the machine is running at light load, for example, with relatively low losses, the amount of liquid can be materially reduced.

In the preferred embodiment of the invention shown in the drawing, this control of the liquid is effected by thermostatically controlling the valve 27 to control the amount of liquid allowed to flow into the machine. For this purpose, a thermostatic device 33, which may be of the bimetallic type, is applied to a desired part of the machine to respond to the machine temperature. As shown in the drawing, the thermostat 33 is disposed between one of the main poles 2 and the field winding 3 so as to be responsive to the field winding temperature. The thermostatic device 33 extends through an opennig in the frame of the machine adjacent the valve 27 and controls the valve by any suitable linkage, generally indicated at 34, to vary the valve opening in accordance with the temperature of the machine. In this way, the flow of liquid into the machine is controlled in accordance with the machine temperature, and the amount of liquid used is limited to the amount actually required to absorb the heat generated in the machine at any given time.

It should now be apparent that a dynamoelectric machine has been provided which is very effectively cooled by vaporization of a liquid. The liquid is directed into the commutator, which is normally the hottest part of a direct-current machine, and thus the greatest cooling effect is obtained where it is most needed. The introduction of the liquid into the interior of the commutator provides effective cooling but does not interfere with commutation, which would be adversely affected by the presence of liquid or vapor on the outer surface of the commutator. The invention has been described with particular reference to aircraft generators, but it will be apparent that its usefulness is not necessarily restricted to this particular application, and it can also be applied to other types of dynamoelectric machines where very effective cooling is needed. A preferred embodiment of the invention has been shown and described for the purpose of illustration, but it will be apparent that various modifications and other embodiments are possible within the scope of the invention, and it is to be understood that the invention is not limited to the specific details of construction shown, but in its broadest aspects it includes all equivalent embodiments and modifications.

I claim as my invention:

1. A dynamoelectric machine having a stator member and a rotor member, said rotor member including an armature member having ventilating passages therethrough and a commutator, said commutator comprising a plurality of commutator bars disposed in a cylinder and clamping means at the ends of the bars to clamp them in assembled relation, said clamping means having axial openings therethrough, means for directing a stream of vaporizable liquid into the interior of the commutator, and means for causing excess liquid to be discharged through the openings at the end of the commutator adjacent the armature member and through said ventilating passages in the armature member.

2. A dynamoelectric machine having a stator member and a rotor member, said rotor member including an armature member having ventilating passages therethrough and a commutator, said commutator comprising a plurality of commutator bars disposed in a cylinder and clamping means at the ends of the bars to clamp them in assembled relation, said clamping means having axial openings therethrough, means for directing a stream of vaporizable liquid into the interior of the commutator, means for causing excess liquid to be discharged through the openings at the end of the commutator adjacent the armature member and through said ventilating passages in the armature member, and means for exhausting vapor and liquid from the machine at the end thereof opposite to the commutator.

3. A dynamoelectric machine having a stator member and a rotor member, said rotor member including an armature member having ventilating passages therethrough and a commutator, said commutator comprising a plurality of commutator bars disposed in a cylinder and clamping means at the ends of the bars to clamp them in assembled relation, said clamping means having axial openings therethrough, means for directing a stream of vaporizable liquid through the openings at the end of the commutator remote from the armature member, the openings at the end of the commutator adjacent the armature member extending to a greater radius than the first-mentioned openings, whereby excess liquid is discharged from the commutator through the ventilating passages in the armature member.

4. A dynamoelectric machine having a stator member and a rotor member, said rotor member including an armature member having ventilating passages therethrough and a commutator, said commutator comprising a plurality of commutator bars disposed in a cylinder and clamping means at the ends of the bars to clamp them in assembled relation, said clamping means having axial openings therethrough, means for directing a stream of vaporizable liquid through the openings at the end of the commutator remote from the armature member, the openings at the end of the commutator adjacent the armature member extending to a greater radius than the first-mentioned openings, whereby excess liquid is discharged from the commutator through the ventilating passages in the armature member, and means for exhausting vapor and liquid from the machine at the end thereof opposite to the commutator.

5. A dynamoelectric machine having a stator member and a rotor member, said rotor member including an armature member having ventilating passages therethrough and a commutator, said commutator comprising a plurality of commutator bars disposed in a cylinder and clamping means at the ends of the bars to clamp them in assembled relation, said clamping means having axial openings therethrough, duct means on the stator member, means for supplying a vaporizable liquid to the duct means, the duct means having a nozzle for directing a stream of said liquid into the interior of the commutator, means for causing excess liquid to be discharged through the openings at the end of the commutator adjacent the armature member and through said ventilating passages in the armature member, and means for exhausting vapor and liquid from the machine at the end thereof opposite to the commutator.

6. A dynamoelectric machine having a stator member and a rotor member, said rotor member including an armature member having ventilating passages therethrough and a commutator, said commutator comprising a plurality of commutator bars disposed in a cylinder and clamping means at the ends of the bars to clamp them in assembled relation, said clamping means having axial openings therethrough, duct means on the stator member, valve means for supplying a vaporizable liquid to the duct means, the duct means having a nozzle disposed to direct a stream of said liquid through the openings at one end of the commutator into the interior of the commutator, means for causing excess liquid to be discharged through the openings at the other end of the commutator and through said ventilating passages in the armature member, and means responsive to the temperature of the machine for actuating said valve means to control the rate of flow of the liquid.

7. A dynamoelectric machine having a stator member and a rotor member, said rotor member including an armature member having ventilating passages therethrough and a commutator, said commutator comprising a plurality of commutator bars disposed in a cylinder and clamping means at the ends of the bars to clamp them in assembled relation, said clamping means having axial openings therethrough, duct means on the stator member, valve means for supplying a vaporizable liquid to the duct means, the duct means having a nozzle disposed to direct a stream of said liquid through the openings at the end of the commutator remote from the armature member, means for causing excess liquid to be discharged through the openings at the other end of the commutator and through said ventilating passages in the armature member, means responsive to the temperature of the machine for actuating said valve means to control the rate of flow of the liquid, and means for exhausting vapor and liquid from the machine at the end thereof opposite to the commutator.

References Cited in the file of this patent

UNITED STATES PATENTS

| 1,549,756 | Farmer | Aug. 18, 1925 |
| 2,604,500 | De Koning | July 22, 1952 |

FOREIGN PATENTS

| 37,670 | Switzerland | May 25, 1906 |
| 165,383 | Great Britain | June 30, 1921 |
| 165,806 | Great Britain | July 11, 1921 |
| 170,946 | Great Britain | Oct. 3, 1921 |